United States Patent
Zerwick (10) Patent No.: US 10,761,559 B2
(45) Date of Patent: Sep. 1, 2020

(54) CLOCK GATING ENABLE GENERATION

(71) Applicant: QUALCOMM Incorporated, San Diego, CA (US)

(72) Inventor: Adam Andrew Zerwick, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 284 days.

(21) Appl. No.: 15/666,107

(22) Filed: Aug. 1, 2017

(65) Prior Publication Data

US 2018/0164846 A1    Jun. 14, 2018

Related U.S. Application Data

(60) Provisional application No. 62/433,547, filed on Dec. 13, 2016.

(51) Int. Cl.
| | |
|---|---|
| *G06F 1/12* | (2006.01) |
| *G06F 13/42* | (2006.01) |
| *G06F 1/08* | (2006.01) |
| *G06F 9/38* | (2018.01) |
| *G06F 1/3237* | (2019.01) |
| *G06F 9/455* | (2018.01) |

(Continued)

(52) U.S. Cl.
CPC .............. *G06F 1/08* (2013.01); *G06F 1/3237* (2013.01); *G06F 9/38* (2013.01); *G06F 9/45504* (2013.01); *G06F 11/3656* (2013.01); *G06F 30/327* (2020.01); *G06F 30/396* (2020.01); *G06F 2119/06* (2020.01); *G06F 2119/12* (2020.01); *Y02D 10/128* (2018.01)

(58) Field of Classification Search
CPC ..................................... G06F 1/32; G06F 1/08
See application file for complete search history.

(56) References Cited

U.S. PATENT DOCUMENTS

| | | | | |
|---|---|---|---|---|
| 6,636,074 B2 | 10/2003 | Schulz | | |
| 7,797,561 B1 * | 9/2010 | Abdalla | ................ | G06F 1/3203 713/322 |

(Continued)

FOREIGN PATENT DOCUMENTS

| | | |
|---|---|---|
| EP | 2124130 A2 | 11/2009 |
| JP | 2004078581 A | 3/2004 |

(Continued)

OTHER PUBLICATIONS

International Search Report and Written Opinion—PCT/US2017/063306—ISA/EPO—dated Feb. 23, 2018.

*Primary Examiner* — Mohammed H Rehman
(74) *Attorney, Agent, or Firm* — Qualcomm Incorporated (57) ABSTRACT

In one embodiment, a clock-gating system for a pipeline includes a clock-gating device configured to gate or pass a clock signal to the pipeline, and a clock controller. The clock controller is configured to track a number of input packets at an input of the pipeline, to track a number of output packets at an output of the pipeline, to determine whether to gate or pass the clock signal based on the number of the input packets and the number of the output packets, to instruct the clock-gating device to pass the clock signal if a determination is made to pass the clock signal, and to instruct the clock-gating device to gate the clock signal if a determination is made to gate the clock signal.

20 Claims, 10 Drawing Sheets

(51) Int. Cl.
   *G06F 11/36*   (2006.01)
   *G06F 30/327*  (2020.01)
   *G06F 30/396*  (2020.01)
   *G06F 119/06*  (2020.01)
   *G06F 119/12*  (2020.01)

(56) References Cited

U.S. PATENT DOCUMENTS

| | | | |
|---|---|---|---|
| 7,802,118 B1* | 9/2010 | Abdalla | G06F 1/08 |
| | | | 713/322 |
| 9,323,315 B2 | 4/2016 | Rozas | |
| 9,443,282 B2 | 9/2016 | Hoshino et al. | |
| 9,557,795 B1 | 1/2017 | Sabih et al. | |
| 2004/0032855 A1 | 2/2004 | Oshima | |
| 2009/0158076 A1* | 6/2009 | Chejara | G06F 1/04 |
| | | | 713/500 |
| 2011/0202788 A1 | 8/2011 | Hesse et al. | |
| 2011/0283125 A1* | 11/2011 | Sundaresan | G06F 1/3237 |
| | | | 713/323 |
| 2013/0003905 A1* | 1/2013 | Jain | H03K 5/1534 |
| | | | 375/360 |
| 2014/0225655 A1* | 8/2014 | Rasouli | H03K 5/135 |
| | | | 327/161 |
| 2015/0178220 A1* | 6/2015 | Grubisic | G06F 12/1027 |
| | | | 711/202 |
| 2017/0092157 A1* | 3/2017 | Christiansen | G06F 21/602 |

FOREIGN PATENT DOCUMENTS

| | | |
|---|---|---|
| JP | 2004274099 A | 9/2004 |
| JP | 2009284008 A | 12/2009 |

* cited by examiner

SOF = Start of Frame
SOL = Start of Line
EOL = End of Line
EOF = End of Frame

| Method | Pipeline Depth | Area (µm²) |
|---|---|---|
| FSM | 2 | 4.4 |
| FSM | 50 | 4.4 |
| FSM | 100 | 4.4 |
| FSM | 500 | 4.4 |
| OR | 2 | 11.7 |
| OR | 50 | 25.5 |
| OR | 100 | 41.2 |
| OR | 500 | 158.5 |
| FIFO | 2 | 22.9 |
| FIFO | 50 | 24.4 |
| FIFO | 100 | 28.8 |
| FIFO | 500 | 32.8 |

CLOCK GATING ENABLE GENERATION

RELATED APPLICATION

This application claims priority under 35 U.S.C. § 119(e) to U.S. Provisional Application No. 62/433,547 filed on Dec. 13, 2016, the entire specification of which is incorporated herein by reference.

BACKGROUND

Field

Aspects of the present disclosure relate to clock gating, and more particularly to clock gating enable generation.

Background

Reducing power consumption in a mobile device is important to extend the battery life of the mobile device. A significant contributor to power consumption of a chip (die) in a mobile device is dynamic power, which is due to switching of transistors on the chip. In this regard, various power reduction schemes have been developed to reduce dynamic power consumption on a chip. One scheme involves gating a clock signal to a circuit (e.g., a pipeline) on the chip when the circuit is not in use (e.g., not processing data). Gating the clock signal to the circuit stops transistors in the circuit from switching, thereby reducing dynamic power.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

One aspect relates to a clock-gating system for a pipeline. The clock-gating system includes a clock-gating device configured to gate or pass a clock signal to the pipeline, and a clock controller. The clock controller is configured to track a number of input packets at an input of the pipeline, to track a number of output packets at an output of the pipeline, to determine whether to gate or pass the clock signal based on the number of the input packets and the number of the output packets, to instruct the clock-gating device to pass the clock signal if a determination is made to pass the clock signal, and to instruct the clock-gating device to gate the clock signal if a determination is made to gate the clock signal.

A second aspect relates to a method for clock gating. The method includes tracking a number of input packets at an input of a pipeline, tracking a number of output packets at an output of the pipeline, and determining whether to gate or pass a clock signal to the pipeline based on the number of the input packets and the number of the output packets. The method also includes passing the clock signal to the pipeline if a determination is made to pass the clock signal, and gating the clock signal if a determination is made to gate the clock signal.

To the accomplishment of the foregoing and related ends, the one or more embodiments include the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

A system may include a pipeline configured to process data from a data source, and output the processed data to a data sink. The pipeline includes multiple pipeline stages (also referred to as processing units or elements) that process the data (e.g., sequentially). A pipeline may be used, for example, to process image data from an image data source, such as a camera sensor or a memory.

Figure 1:
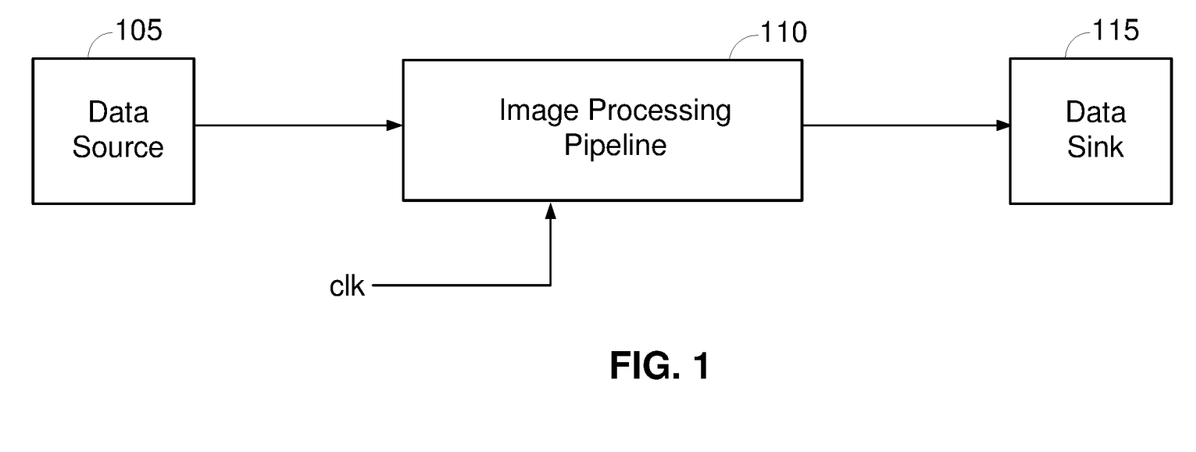
FIG. 1 shows an example of an image processing pipeline.

In this regard, FIG. 1 shows an example of an image processing pipeline 110 (also referred to as an image signal processing (ISP) module). The image processing pipeline 110 receives data (e.g., image data) from a data source 105 (e.g., a camera sensor, a memory, etc.). The image processing pipeline 110 processes the received data, and outputs the processed data (e.g., processed image data) to a data sink 115 (e.g., a display processor, a central processing unit (CPU), a memory, etc.). The image processing pipeline 110 includes multiple pipeline stages for processing the data.

The image processing may include one or more of the following: noise filtering, color correction, tone mapping, demosaicing, etc.

The image processing pipeline 110 receives a clock signal (denoted "clk") for timing operations of the image processing pipeline 110. The clock signal clk is required for the image processing pipeline 110 to process data. However, there are certain periods of time (e.g., between frames) during which there is no data in the image processing pipeline 110 that needs to be processed. During these periods of time, it is desirable to gate (disable) the clock signal clk to the image processing pipeline 110 to conserve power. Gating the clock signal clk reduces dynamic power consumption by stopping switching of transistors in the image processing pipeline 110 when there is no data in the pipeline 110 that needs to be processed.

Figure 2A:
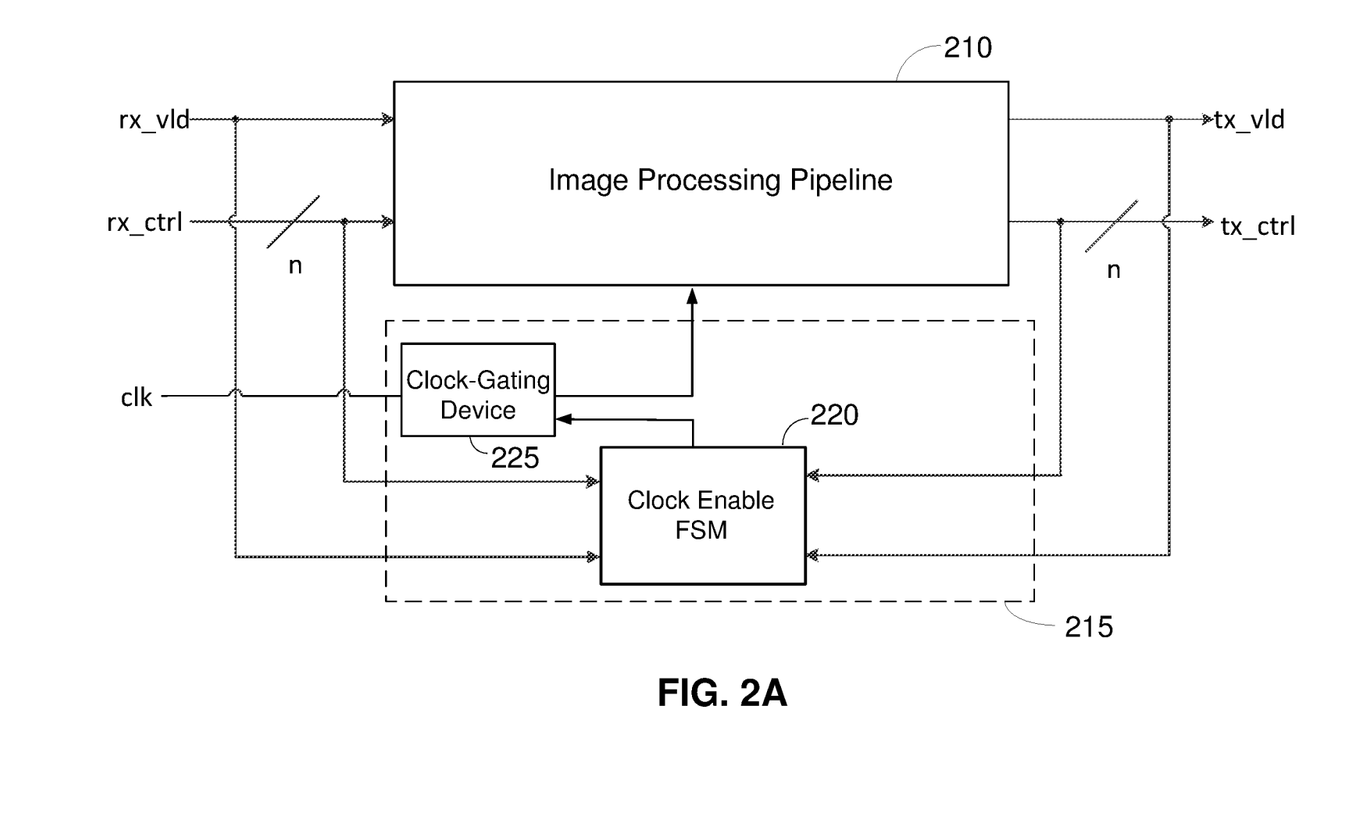
FIG. 2A shows an example of a clock-gating system including a finite state machine.

FIG. 2A shows an example of clock gating in accordance with one approach. In this approach, a clock-gating system 215 includes a clock enable finite state machine (FSM) 220, and a clock-gating device 225. The clock-gating device 225 is configured to selectively gate the clock signal clk to the image processing pipeline 210 under the control of the FSM 220, as discussed further below.

In this example, the image processing pipeline 210 receives valid data (e.g., pixel data) from the data source (not shown in FIG. 2A) in frames, in which each frame includes multiple lines of valid data. In FIG. 2A, valid data received by the image processing pipeline 210 from the data source is denoted "rx_vld," and valid data output by the image processing pipeline 210 to the data sink (not shown in FIG. 2A) is denoted "tx_vld."

In this example, the image processing pipeline 210 receives a receive control signal (denoted "rx_ctrl") from the data source, and outputs a transmit control signal (denoted "tx_ctrl") to the data sink. The receive control signal rx_ctrl includes markers indicating the start of an incoming frame (denoted "$rx_{sof}$"), the end of an incoming frame (denoted "$rx_{eof}$"), the start of an incoming line (denoted "$rx_{sol}$"), and the end of an incoming line (denoted "$rx_{eol}$"). The transmit control signal tx_ctrl includes markers indicating the start of an outgoing frame (denoted "$tx_{sof}$"), the end of an outgoing frame (denoted "$tx_{eof}$"), the start of an outgoing line (denoted "$tx_{sol}$"), and the end of an outgoing line (denoted "$tx_{eol}$").

Figure 2B:
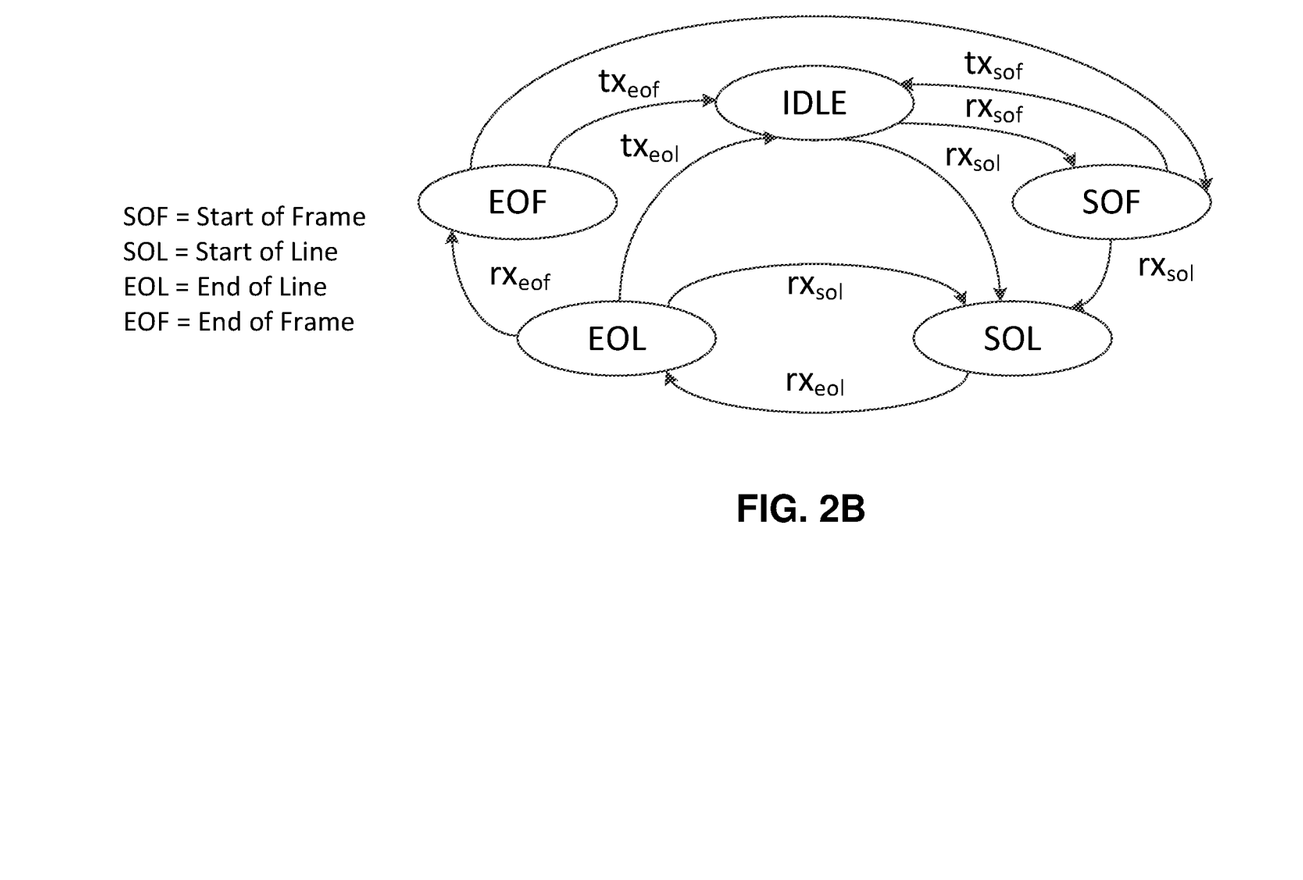
FIG. 2B shows an exemplary state diagram for the finite state machine in FIG. 2A.

In operation, the FSM 220 receives the receive control signal rx_ctrl and the transmit control signal tx_ctrl, and determines whether to instruct the clock-gating device 225 to gate (disable) the clock signal clk or pass (enable) the clock signal clk based on the received control signals. For instance, the FSM 220 may instruct the clock-gating device 225 to gate (disable) the clock signal clk between the end of an outgoing frame ($tx_{eof}$) and the start of the next incoming frame ($rx_{sof}$), assuming there is no valid data between adjacent frames. The FSM 220 may also instruct the clock-gating device 225 to gate (disable) the clock signal clk between the end of an outgoing line ($tx_{eol}$) and the start of the next incoming line ($rx_{sol}$), assuming there is no valid data between adjacent lines. Thus, the FSM 220 may gate (disable) the clock signal clk between adjacent frames and between adjacent lines within a frame to reduce power consumption. FIG. 2B shows an exemplary state machine diagram for the FSM 220 according to certain aspects, in which the clock signal clk is gated in the idle state.

A drawback of this approach is that the FSM 220 does not gate (disable) the clock signal clk when there are one or more bubbles within an active line, in which a bubble is a gap with no valid data. Thus, this approach misses opportunities to gate (disable) the clock signal clk during certain periods of time when there is no valid data in the pipeline 210, thereby wasting power.

Figure 3:
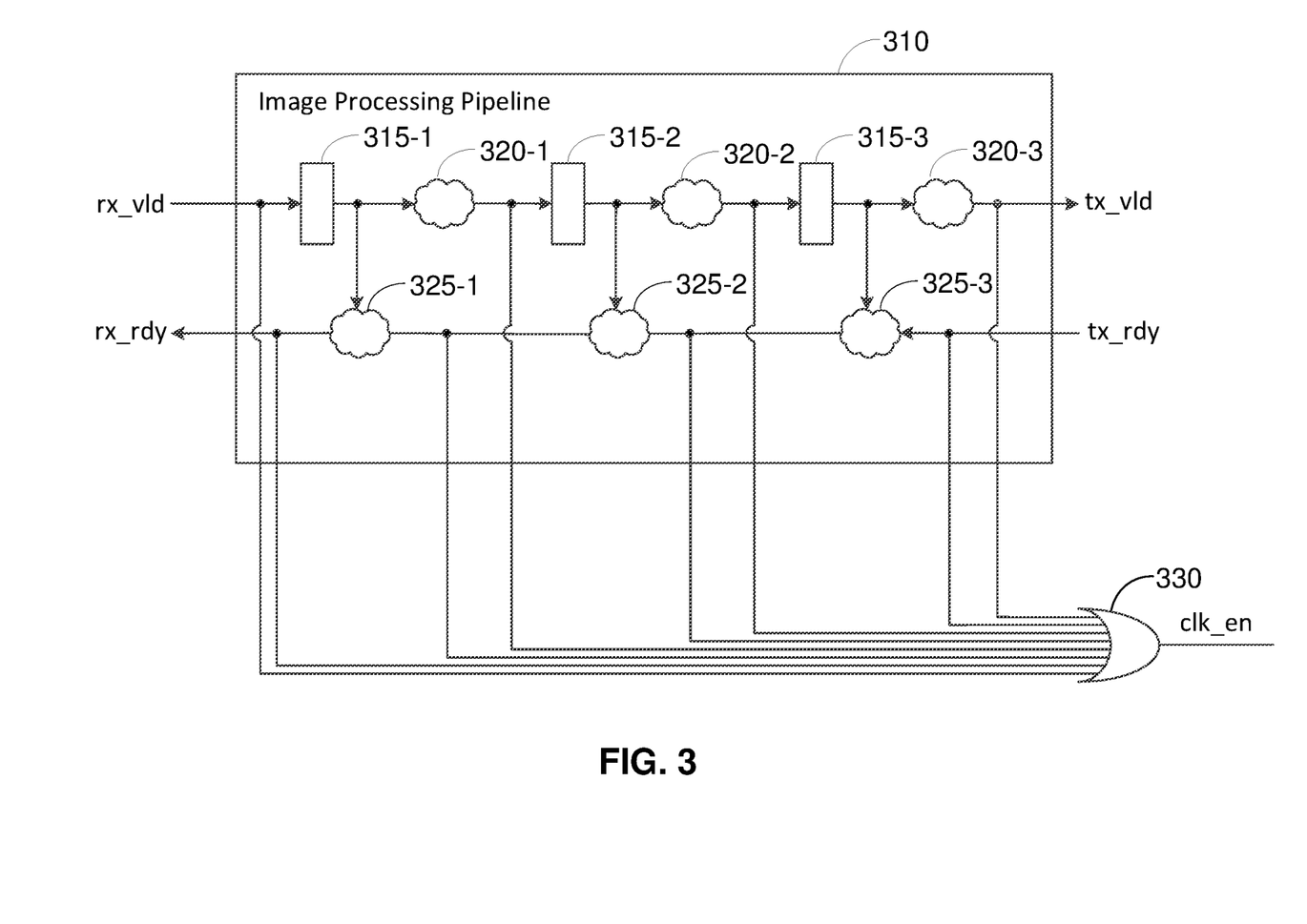
FIG. 3 shows an example of a clock-gating system configured to check for valid data and/or a ready signal at each stage of a pipeline.

FIG. 3 shows an example of clock gating according to another approach. In this approach, the image processing pipeline 310 receives valid data rx_vld from the data source (not shown in FIG. 3), and outputs valid data tx_vld to the data sink (not shown in FIG. 3). In addition, the image processing pipeline 310 outputs a receive ready signal (denoted "rx_rdy") to the data source to indicate to the data source that the image processing pipeline 310 is ready to receive valid data from the data source. The image processing pipeline 310 also receives a transmit ready signal (denoted "tx_rdy") from the data sink indicating that the data sink is ready to receive valid data from the image processing pipeline 310.

In this example, the image processing pipeline 310 includes latches 315-1 to 315-3 for latching valid data (e.g., pixel data) at different points in the image processing pipeline 310, and processing units 320-1 to 320-3 (e.g., combinational logic) configured to process valid data at different pipeline stages. The image processing pipeline 310 also includes logic 325-1 to 325-3 for generating the receive ready signal rx_rdy. For example, the logic 325-1 to 325-3 may check the latches for valid data and check the transmit ready signal tx_rdy to determine whether the pipeline 310 is ready to receive more valid data from the data source. For instance, the logic 325-1 to 325-3 may de-assert the receive ready signal rx_rdy if the latches are full and the transmit ready signal tx_rdy is not asserted. In this case, the pipeline 310 may be full and unable to output (transmit) valid data to the data sink to make room in the pipeline 310 for more valid data. The latches 315-1 to 315-3, the processing units 320-1 to 320-3 and/or the logic 325-1 to 325-3 may be timed using the clock signal clk (not shown in FIG. 3).

In this example, the clock-gating system includes clock-gating control logic 330 (represented as an OR gate in FIG. 3) that checks whether there is any valid data in the pipeline 310. The clock-gating control logic 330 does this by checking each one of the pipeline stages for valid data and/or a ready signal. If the clock-gating control logic 330 detects valid data and/or a ready signal in at least one of the pipeline states, then the clock-gating control logic 330 enables (passes) the clock signal clk to the image processing pipeline 310. If the clock-gating control logic 330 does not detect any valid data and/or ready signal, then the clock-gating control logic 330 disables (gates) the clock signal clk.

Unlike the previous clock-gating approach discussed above with reference to FIG. 2A, this approach is able to gate (disable) the clock signal clock clk during a bubble (gap with no valid data) within an active line. This is because this approach gates (disabled) the clock signal clock clk when there is no valid data in the pipeline 310. However, this approach can potentially lead to timing related issues when the pipeline depth is large, clock frequencies are high, etc. This is because the fan in (i.e., number of inputs) to the clock-gating control logic 330 increases as the pipeline depth (number of pipeline stages) increases. The increase in the fan in increases propagation delays in the clock-gating control logic 330, which makes it more difficult for the clock-gating control logic 330 to meet certain timing requirements for proper operation, especially at high frequencies. As a result, it is difficult to scale up the pipeline 310 using this approach.

Figure 4:
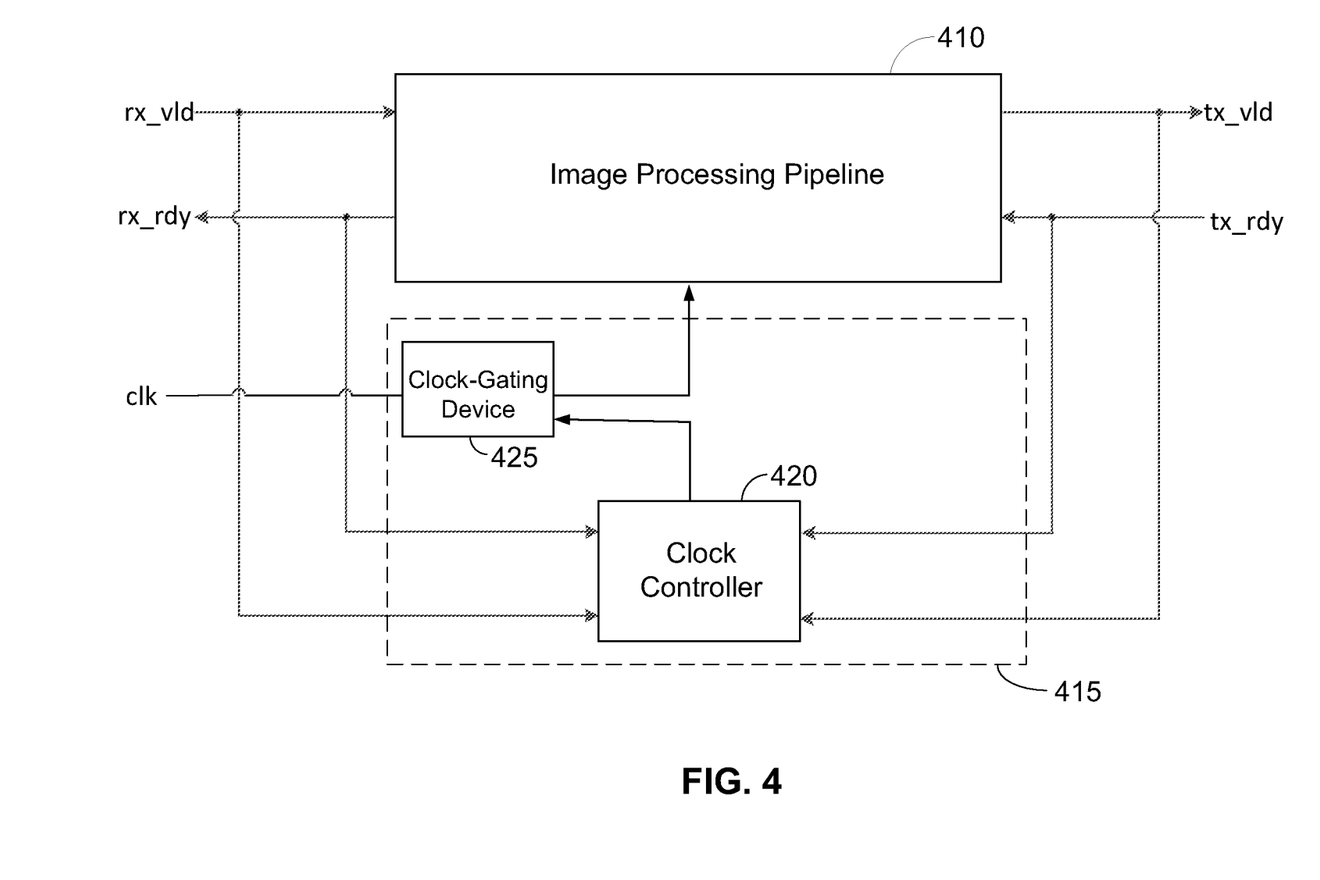
FIG. 4 shows an example of a clock-gating system according to aspects of the present disclosure.

FIG. 4 shows a clock-gating system 415 according to certain aspects of the present disclosure. The clock-gating system 415 includes a clock controller 420, and a clock-gating device 425. The clock-gating device 425 is configured to selectively gate the clock signal clk to the image processing pipeline 410 under the control of the clock controller 420, as discussed further below.

In operation, the image processing pipeline 410 receives valid data (e.g., pixel data) from the data source in packets and outputs valid data (e.g., pixel data) to the data sink in packets. Each packet may include N bits of valid data (e.g., 8 to 14 bits). The clock controller 420 tracks the number of input packets at the input of the image processing pipeline 410 (number of packets received by the image processing pipeline 410). The clock controller 420 also tracks the number of output packets at the output of the image processing pipeline 410 (number of packets output by the image processing pipeline 410). In one example, the clock controller 420 tracks the number of input packets when the receive ready signal rx_rdy is asserted, and tracks the number of output packets when the transmit ready signal tx_rdy is asserted. In another example, the clock controller 420 tracks the number of input packets and tracks the number of output packets independent of the receive ready signal rx_rdy and transmit ready signal tx_rdy, respectively.

The clock controller 420 then compares the number of input packets with the number of output packets to determine whether the image processing pipeline 410 is empty (no valid data in the pipeline 410). For example, the clock controller 420 may determine that the pipeline 410 is empty when the number of input packets and the number of output packets match, and determine that the pipeline 410 is not empty when the number of number of input packets and the number of output packets do not match.

If the clock controller 420 determines that the pipeline 410 is empty, then the clock controller 420 may instruct the clock-gating device 425 to gate (disable) the clock signal clk to the pipeline 410 to conserve power. In one example, after determining that the pipeline 410 is empty, the clock controller 420 may also check whether there is an incoming packet of valid data at the input of the pipeline 410. If the clock controller 420 does not detect an incoming packet of valid data, then the clock controller 420 may instruct the clock-gating device 425 to gate (disable) the clock signal clk to the pipeline 410.

If the clock controller 420 determines that the pipeline 410 is not empty, then the clock controller 420 may leave the clock signal clk enabled (ungated).

After the clock signal clk to the pipeline 410 is gated (disabled), the clock controller 420 may monitor the input of the pipeline 410 for an input packet of valid data. If the clock controller 420 detects an input packet, then the clock controller 420 enables (passes) the clock signal clk so that the pipeline 410 can start processing the input packet. If the clock controller 420 does not detect an input packet, then the clock controller 420 leaves the clock signal clk disabled (gated). In one example, the clock controller 420 monitors the input of the pipeline 410 for an input packet when the receive ready rx_rdy is asserted. In this example, the pipeline 410 holds the receive ready signal rx_rdy when the clock signal clk is gated. In another example, the clock controller 420 monitors the input of the pipeline 410 for an input packet independent of the receive ready signal rx_rdy.

The clock controller 420 is advantageous over the first clock-gating approach discussed above with reference to FIG. 2A in that the clock controller 420 is able to gate the clock signal clk during a bubble within an active line. This is because the clock controller 420 gates the clock signal clk when the pipeline 410 becomes empty during the bubble.

Further, the clock controller 420 is advantageous over the second clock-gating approach discussed above with reference to FIG. 3 in that the clock controller 420 has a small fan in (number of inputs) compared with the clock-gating control logic 330 shown in FIG. 3. This is because the clock controller 420 checks the input and output of the pipeline 410 instead of checking each pipeline stage of the pipeline 410 for valid data and/or a ready signal. As a result, the fan in of the clock controller 420 does not need to increase as more pipeline stages are added, making this approach more scalable. The relatively small fan in of this approach mitigates the timing issues associated with the second clock-gating approach discussed above.

Figure 5:
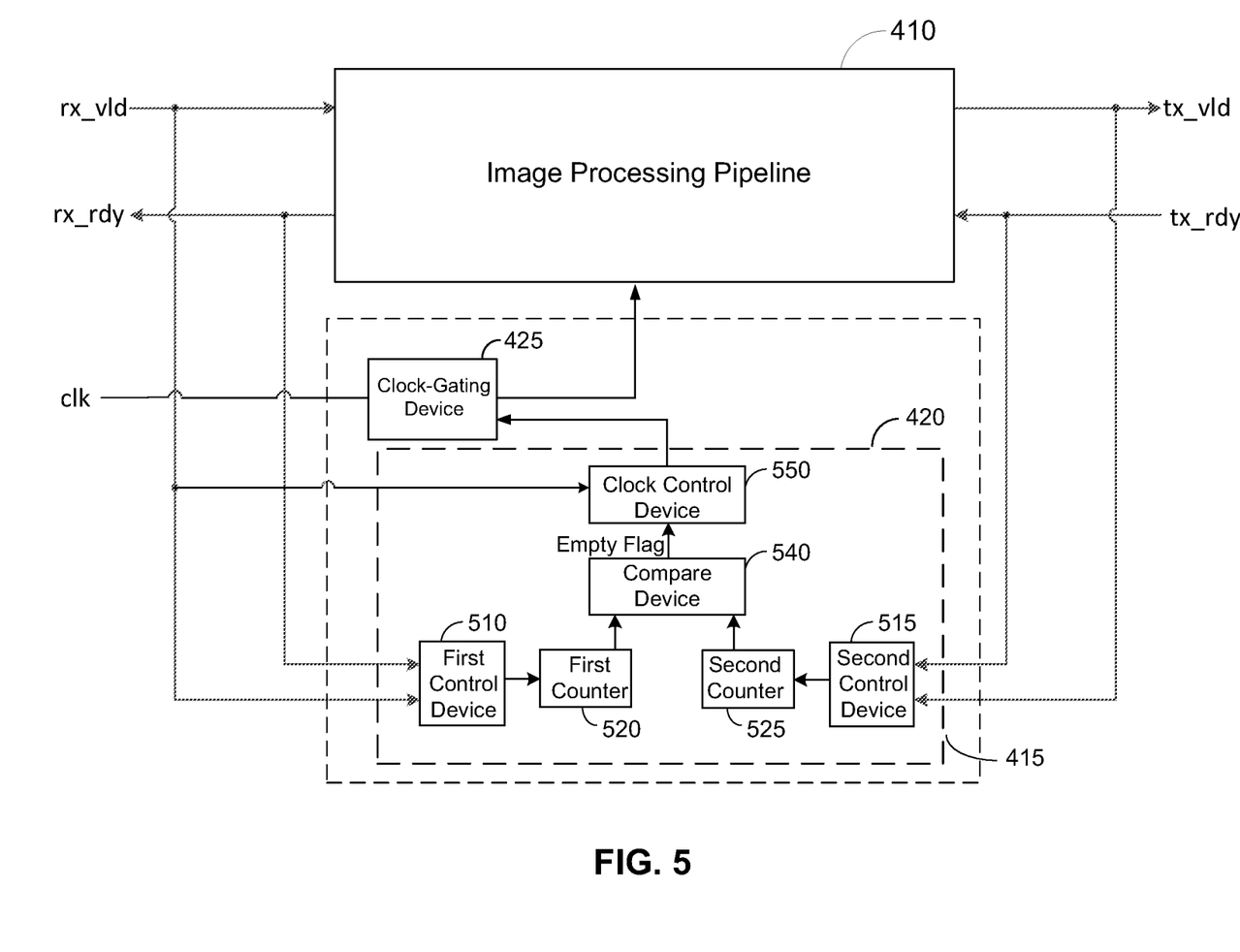
FIG. 5 shows an exemplary implementation of a clock controller according to certain aspects of the present disclosure.

FIG. 5 shows an exemplary implementation of the clock controller 420 according to certain aspects of the present disclosure. In this example, the clock controller 420 includes a first control device 510, a first counter 520, a second control device 515, a second counter 525, a compare device 540, and a clock control device 550. The first counter 520 is configured to count a number of input packets, and the second counter 515 is configured to count a number of output packets, as discussed further below. Each counter may be a wrap-around counter that wraps around when a maximum counter value is reached.

In operation, the first control device 510 monitors the input of the pipeline 410 for input packets of valid data (e.g., when the receive ready signal rx_rdy is asserted). For example, each incoming packet may be indicated by a packet indicator (e.g., delimiter). The packet indicator may be located at the start of the packet or the end of the packet. In this example, the first control device 510 may detect an input packet by detecting the respective packet indicator. The first control device 510 may increment the count value of the first counter 520 each time the first control device 510 detects an input packet. Thus, in this example, the first counter 520 tracks a number of input packets.

The second control device 515 monitors the output of the pipeline 410 for output packets of valid data (e.g., when the transmit ready signal tx_rdy is asserted). For example, each outgoing packet may be indicated by a packet indicator (e.g., delimiter). The packet indicator may be located at the start of the packet or the end of the packet. In this example, the second control device 515 may detect an output packet by detecting the respective packet indicator. The second control device 515 may increment the count value of the second counter 525 each time the second control device 515 detects an output packet. Thus, in this example, the second counter 525 tracks a number of output packets.

The compare device 540 compares the count value of the first counter 520 with the count value of the second counter 525. If the count values match, then the compare device 540 determines that the pipeline 410 is empty. If the count values do not match, then the compare device 540 determines that the pipeline 410 is not empty. The compare device 540 then generates an empty flag based on the comparison, in which the empty flag indicates whether the pipeline 410 is empty. For example, the empty flag may have a first logic value (e.g., one) when a determination is made that the pipeline 410 is empty, and a second logic value (e.g., zero) when a determination is made that the pipeline 410 is not empty.

The clock control device 550 is configured to receive the empty flag from the compare device 540. If the empty flag indicates that the pipeline is not empty, then the clock control device 550 may leave the clock signal clk enabled (ungated). In this case, the clock-gating device 425 passes the clock signal clk to the pipeline 410. If the empty flag indicates that the pipeline is empty, then the clock control device 550 may instruct the clock-gating device 425 to gate (disable) the clock signal clk to the pipeline 410. In one example, if the empty flag indicates that the pipeline is empty, then the clock control device 550 may also check whether there is an incoming packet of valid data at the input of the pipeline 410. If the clock control device 550 does not detect an incoming packet of valid data, then the clock control device 550 may instruct the clock-gating device 425 to gate (disable) the clock signal clk to the pipeline 410. In this example, the clock control device 550 may detect an incoming packet by detecting the respective packet indicator (e.g., delimiter). When the clock-gating device 425 gates (disables) the clock signal clk, the clock-gating device 425 outputs a constant logic state (zero or one) to the pipeline 410 independent of the logic state of the clock signal clk.

After the clock signal clk to the pipeline 410 is gated (disabled), the clock control device 550 may monitor the input of the pipeline 410 for an input packet of valid data. If the clock control device 550 detects an input packet, then the clock control device 550 enables (passes) the clock signal clk. If the clock control device 550 does not detect an input packet, then the clock control device 550 leaves the clock signal clk disabled (gated).

In one example, the clock control device 550 may be configured to output a first logic value (e.g., one) to the clock-gating device 425 to enable the clock signal clk, and to output a second logic value (e.g., zero) to the clock-gating device 425 to gate (disable) the clock signal clk. In this example, the clock control device 550 outputs the first logic value when the empty flag indicates that the pipeline is not empty. The clock control device 500 may output the second logic value when the empty flag indicates that the pipeline is empty. In one example, the clock control device 550 may output the second logic value when both the empty flag indicates that the pipeline 410 is empty and no input packet is detected at the input of the pipeline. After the clock signal clk is gated, the clock control device 550 may monitor the input of the pipeline for an input packet, and change its output from the second logic value to the first logic value upon detection of an input packet to re-enable the clock signal clk.

Figure 6:
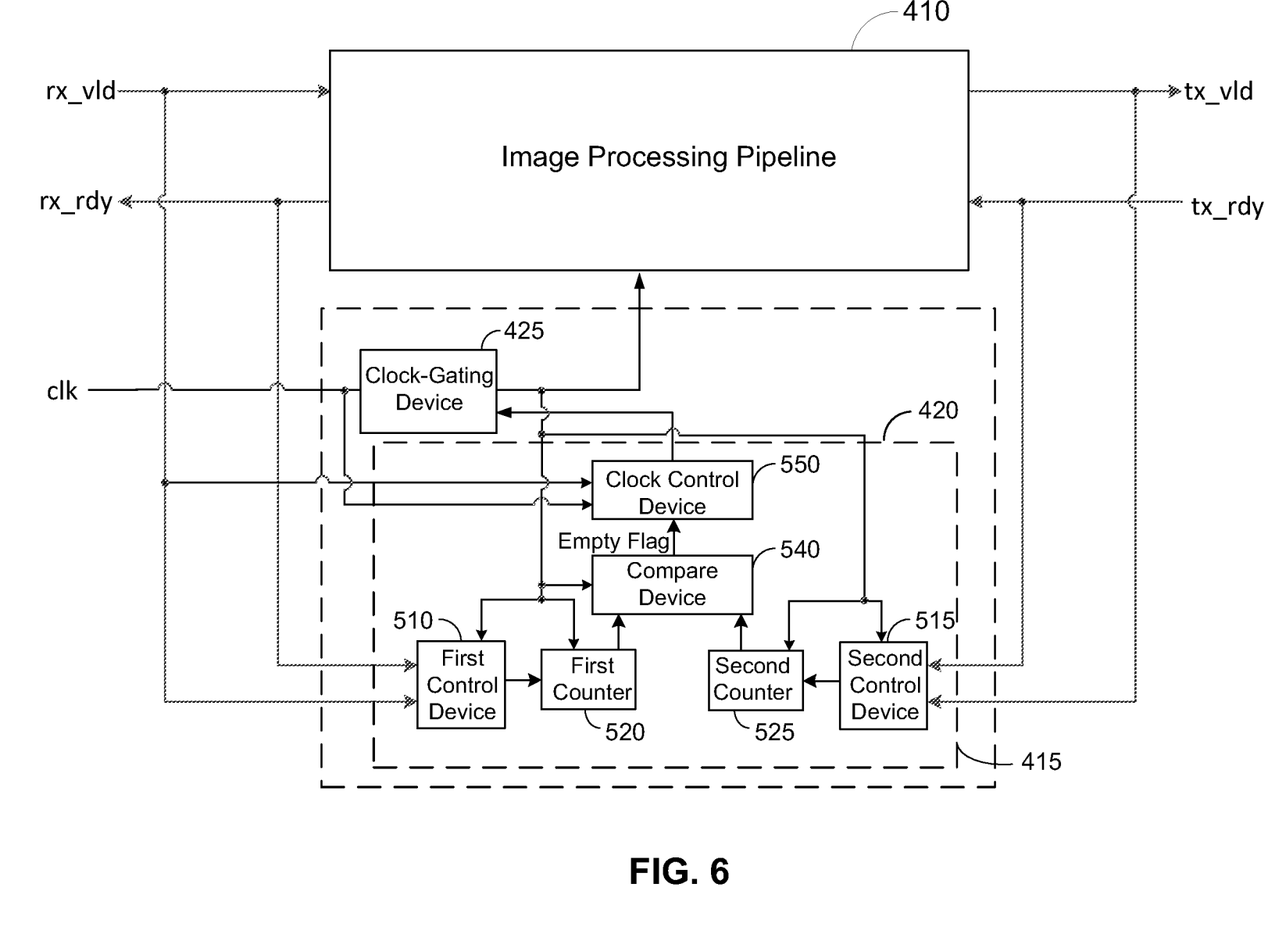
FIG. 6 shows an example in which the clock controller in FIG. 5 receives a clock signal for timing operations of the clock controller according to certain aspects of the present disclosure.

The clock controller 420 may also receive the clock signal clk to time operations of the clock controller 420. In this regard, FIG. 6 shows an example in which the first control device 510, the first counter 520, the second control device 515, the second counter 525, and the compare device 540 receive the clock signal clk from the output of the clock-gating device 425. Thus, in this example, when the clock signal clk to the pipeline 420 is disabled (gated), the clock signal clk to the first control device 510, the first counter 520, the second control device 515, the second counter 525 and the compare device 540 is also gated to conserve power. The first and second counters 520 and 525 may hold their current count values when the clock signal clk is gated. In this example, each of the first and second counters 520 and 525 may resume counting from the held count value when the clock signal clk is re-enabled. Alternatively, the counters 520 and 525 may be reset when the clock signal clk is gated. In this example, each of the first and second counters 520 and 525 may start counting from a reset count value (e.g., zero) when the clock signal clk is re-enabled.

The clock signal clk to the clock control device 550 may bypass the clock-gating device 425 so that the clock signal clk to the clock control device 550 is not gated when the clock signal clk to the pipeline 410 is gated. In this example, the clock signal clk may be used to time operations of the clock control device 550 used to detect an input packet at the input of the pipeline 410 and, upon detection of an input packet, to enable (pass) the clock signal clk to the pipeline 410. In another example, the clock control device 550 may include one or more logic gates that do not need the clock signal clk to enable the clock signal clk when an input packet is present at the input of the pipeline 410. In this case, the clock signal clk need not be provided to the clock-gating device 425.

Various components of the clock controller 420 may be implemented using components from a synchronous first-in first-out (FIFO) controller, as discussed further below.

A synchronous FIFO controller controls the writing of data to and the reading of data from a FIFO memory. In this regard, a FIFO controller may include a write counter, a read counter and a compare device. The count value of the write counter is incremented when data is input to the FIFO memory, and is used to generate a write pointer that specifies the location (address) in the FIFO memory at which the data is to be written. The count value of the read counter is incremented when data is read out from the FIFO memory, and is used to generate a read pointer that specifies the location (address) in the FIFO memory from which the data is to be read out. The compare device compares the write pointer with the read pointer to determine whether the FIFO memory is empty, and outputs an empty flag based on the comparison indicating whether the FIFO memory is empty. For example, the compare device may determine that the FIFO memory is empty when the write pointer and the read pointer match.

In one example, the first counter 520, the second counter 525 and the compare device 540 of the clock controller 420 may be implemented using a write counter, a read counter and a compare device from a FIFO controller. In this example, the pipeline 410 is treated as a FIFO memory for the purpose of determining whether the pipeline 410 is empty. This allows the clock controller 420 to reuse components (e.g., write counter, read counter and compare device) of a FIFO controller used to generate the empty flag for the FIFO controller to generate the empty flag for the clock controller 420.

It should be noted that, although the pipeline 410 is treated as a FIFO memory for the purpose of determining whether the pipeline 410 is empty in the above example, the pipeline differs from a FIFO memory in other respects. For instance, the pipeline 410 processes data while a FIFO memory simply stores (e.g., buffers) data.

Figure 7:
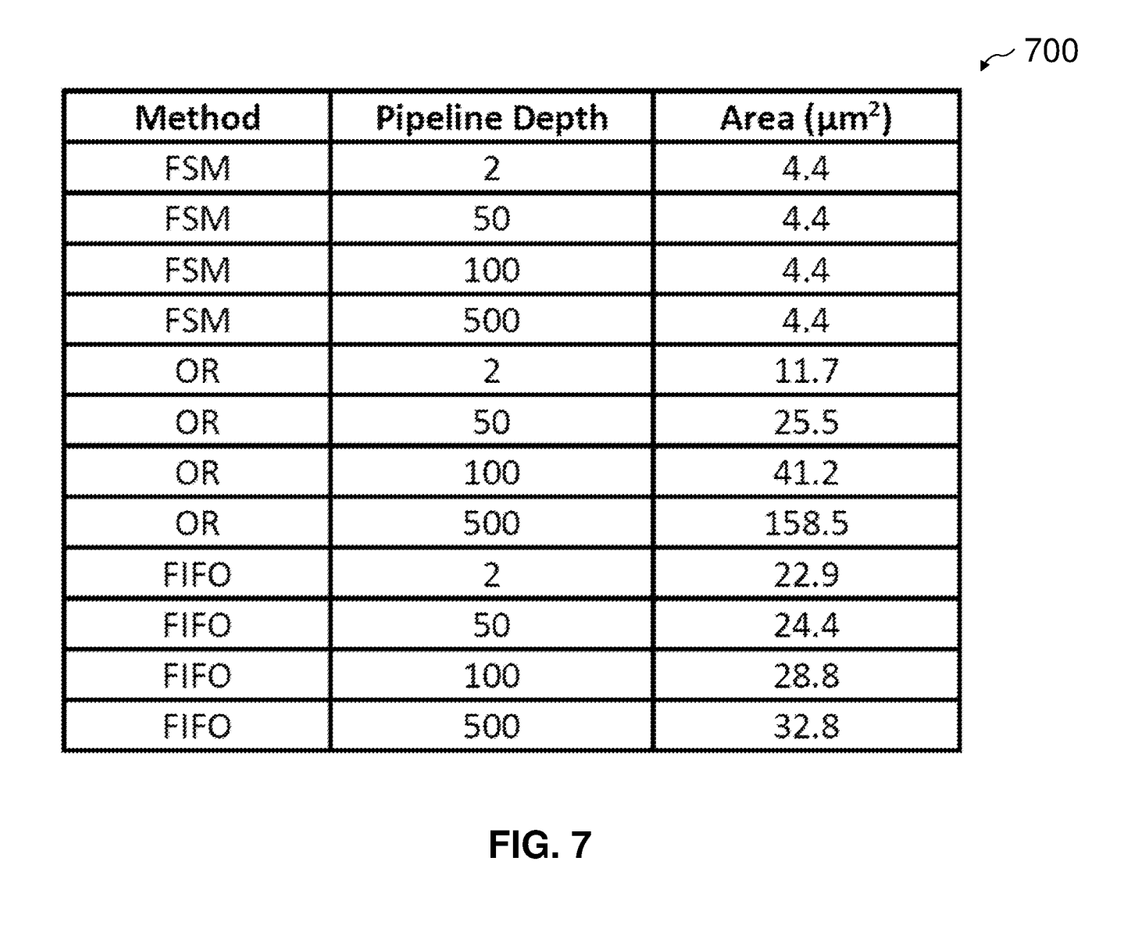
FIG. 7 is a table showing examples of chip areas for different clock gating methods and different pipeline depths.

FIG. 7 is a table 700 showing examples of chip areas for the three different clock-gating methods discussed for different pipeline depths (i.e., different numbers of pipeline stages). The first four rows in the table 700 show examples of chip areas for the FSM approach (shown in FIG. 2A) for pipeline depths of 2, 50, 100 and 500. The next four rows in the table 700 show examples of chip areas for the OR gate approach (shown in FIG. 3) for pipeline depths of 2, 50, 100 and 500. The last four rows in the table 700 show examples of chip areas for the FIFO approach (shown in FIGS. 4-6) for pipeline depths of 2, 50, 100 and 500.

As shown in FIG. 7, the chip area for the FSM approach does not increase as the pipeline depth goes up. In contrast, the chip area for the OR gate approach increases approximately linearly with increases in pipeline depth. This is because an additional input is added to the OR gate for each additional pipeline stage. The OR gate approach is not very scalable because increases in the pipeline depth can result in significant increases in the chip area taken up by the OR gate. The significant increase in chip area are not only takes up valuable real estate on the chip, but also translates into a significant increase in power consumption.

The chip area for the FIFO approach increases slightly with increases in pipeline depth. The increase in chip area is due to extra bits needed to track a larger number of incoming and outgoing packets as the pipeline depth increases. The extra bits scale with log 2 (i.e., base 2 logarithm) of the pipeline depth. As shown in table 700, the increase in chip area for the FIFO approach is significantly less than the OR gate approach. Thus, as the pipeline depth increases, the FIFO approach requires significantly less area and power than the OR gate approach.

The FIFO approach occupies more chip area than the FSM approach in the example shown in FIG. 7. However, the FIFO approach is able to gate the clock signal clk during bubbles in active lines, while the FSM approach does not gate the clock signal clk during bubbles, as discussed above. Thus, the FIFO approach is able to gate the clock signal more often (i.e., exploit more opportunities to gate the clock signal), resulting in more power savings from clock gating.

The clock-gating device 425 may be implemented using any one of a number of clock-gating cells (CGCs) known in the art. For example, the standard cell library for a chip (die) typically includes one or more CGCs. In this example, one of the CGCs in the cell library may be selected to implement the clock-gating device 425.

Figure 8:
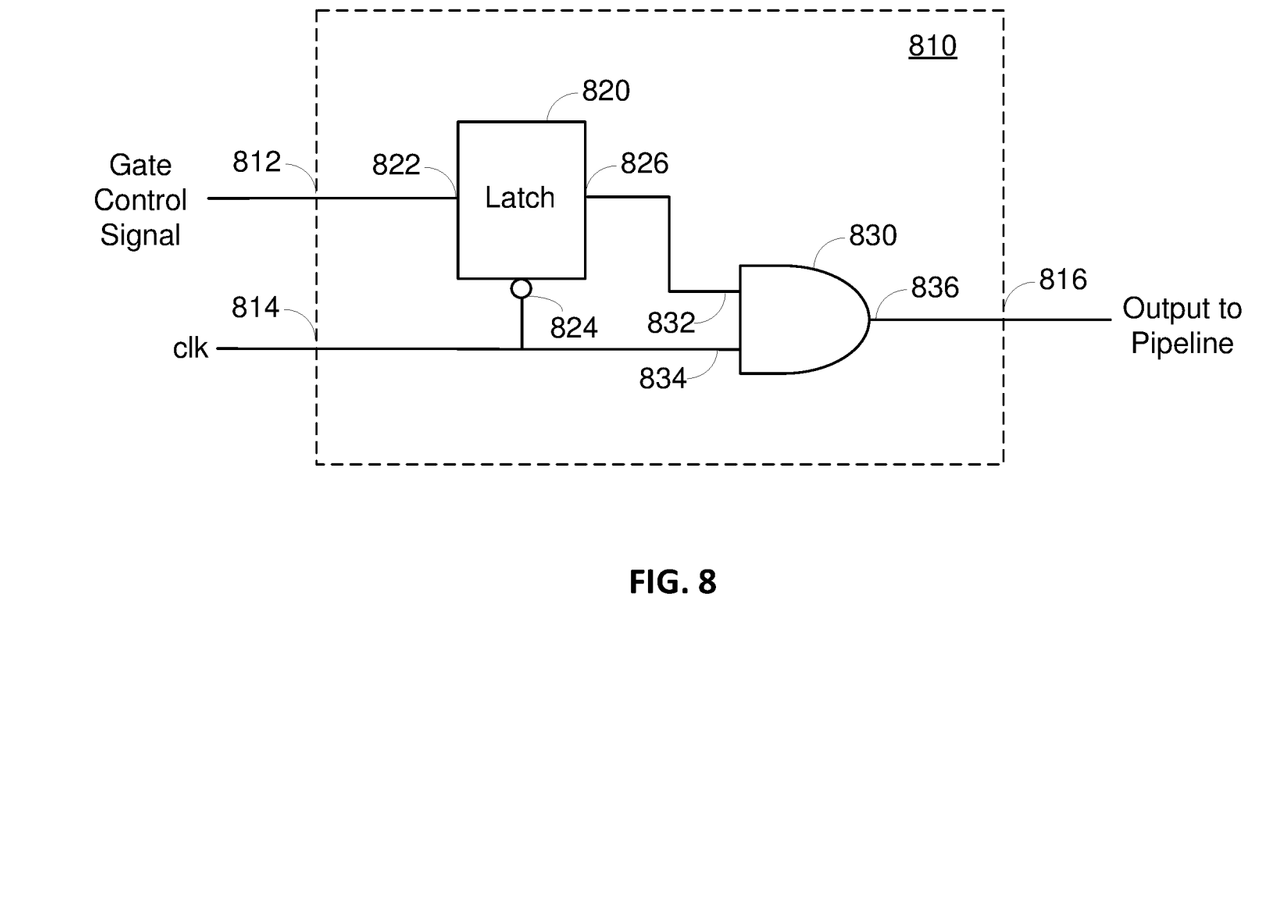
FIG. 8 shows an example of a clock gating cell (CGC) that may be used in a clock-gating system according to certain aspects of the present disclosure.

In this regard, FIG. 8 shows an exemplary clock-gating cell (CGC) 810 that may be used to implement the clock-gating device 425. In this example, the CGC 810 includes a negative-edge triggered latch 820 and an AND gate 830. The CGC 810 has a gate-control input 812 that receives a gate control signal from the clock control device 550, a clock input 814 that receives the clock signal clk, and an output 816 coupled to the clock input of the pipeline 410. The latch 820 has a control input 822 that receives the gate control signal, a clock input 824 that receive the clock signal clk, and an output 826. The AND gate 830 has a first input 832 coupled to the output 826 of the latch 820, a second input 834 that receives the clock signal clk, and an output 836 coupled to the output 816 of the CGC 810.

In this example, the CGC 810 gates the clock signal clk when the gate control signal from the clock control device 550 is low (logic zero). In this case, the CGC 810 outputs a logic zero to the pipeline 410 regardless of the logic state of the clock signal clk. The CGC 810 passes the clock signal clk to the pipeline 410 when the gate control signal is high (logic one). The gate control signal may also be referred to as the clock enable signal since it controls whether the clock signal clk to the pipeline is enabled.

In operation, the latch 820 latches the logic value of the gate control signal on a falling edge of the clock signal clk, and outputs the latched logic value of the gate control signal to the first input 832 of the AND gate 830. If the latched logic value of the gate control signal is logic one, then the AND gate 830 passes the clock signal clk to the output 816 of the CGC 810. If the latched logic value of the gate control signal is logic zero, then the AND gate 830 outputs a logic zero regardless of the logic state of the clock signal clk, effectively gating the clock signal clk. In this example, the latch 820 is used to prevent glitches at the output 816 of the CGC 810. It is to be appreciated that the CGC 810 shown in FIG. 8 is exemplary only, and that the clock-gating device 425 may be implemented using other CGCs known in the art.

Figure 9:
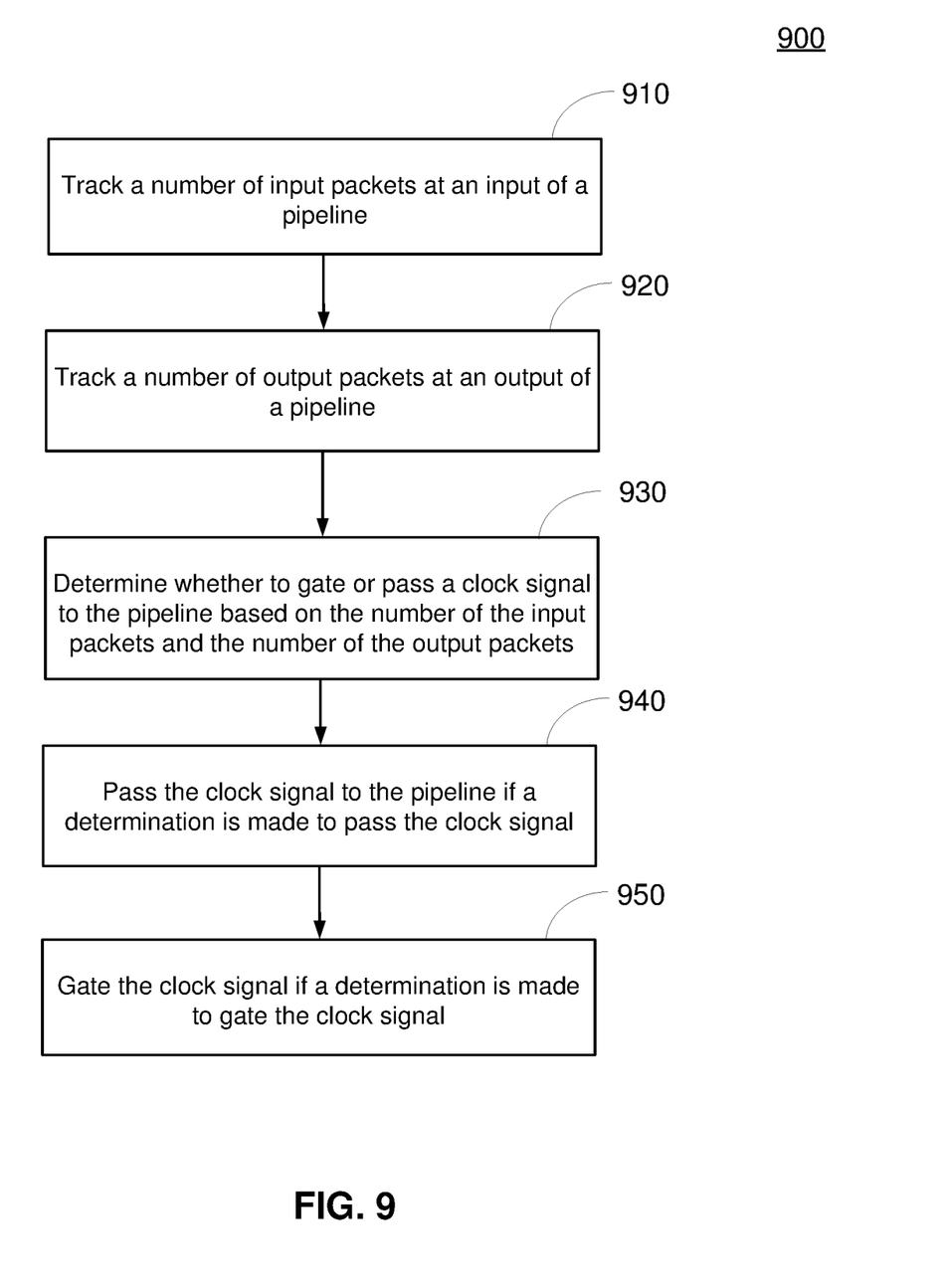
FIG. 9 is a flowchart illustrating a method for clock gating according to certain aspects of the present disclosure.

FIG. 9 illustrates a method 900 for clock gating according to certain aspects of the present disclosure. The method 900 may be performed by the clock controller 420 and the clock-gating device 425.

At step 910, a number of input packets at an input of a pipeline is tracked. For example, the number of input packets may be tracked by incrementing a count value of a first counter (e.g., first counter 520) for each input packet.

At step 920, a number of output packets at an output of the pipeline is tracked. For example, the number of input packets may be tracked by incrementing a count value of a second counter (e.g., second counter 525) for each output packet.

At step 930, a determination is made whether to gate or pass a clock signal to the pipeline based on the number of input the packets and the number of the output packets. For example, a determination may be made to gate the clock signal if the number of the input packets and the number of the output packets match, and a determination may be made to pass the clock signal to the pipeline if the number of the input packets and the number of the output packets do not match.

At step 940, the clock signal is passed to the pipeline if a determination is made to pass the clock signal.

At step 950, the clock signal is gated if a determination is made to gate the clock signal.

The clock controller 420 discussed above may be implemented with a general-purpose processor, a digital signal processor (DSP), an application specific integrated circuit (ASIC), a field programmable gate array (FPGA) or other programmable logic device, discrete hardware components (e.g., logic gates), or any combination thereof designed to perform the functions described herein. A processor may perform the functions described herein by executing software comprising code for performing the functions. The software may be stored on a computer-readable storage medium, such as a RAM, a ROM, an EEPROM, an optical disk, and/or a magnetic disk.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation.

Although the present disclosure is discussed above using the example of an image processing pipeline, it is to be appreciated that the present disclosure is not limited to this example. Embodiments of the present disclosure may be applied to other types of pipelines that process data to gate the clock signal to the other types of pipelines.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A clock-gating system for a multi-stage pipeline, comprising:
   a clock-gating device configured to pass or gate a clock signal to the multi-stage pipeline; and a clock controller configured to track a number of input packets at at least a single input of the multi-stage pipeline, to track a number of output packets at at least a single output of the multi-stage pipeline, to determine whether to pass or gate the clock signal based on the number of the input packets at the at least single input of the multi-stage pipeline and the number of the output packets at the at least single output of the multi-stage pipeline, to instruct the clock-gating device to pass the clock signal if a determination is made to pass the clock signal, and to instruct the clock-gating device to gate the clock signal if a determination is made to gate the clock signal.

2. The clock-gating system of claim 1, wherein the clock controller comprises:
a first counter;
a first control device configured to detect the input packets at the input of the multi-stage pipeline, and to increment a count value of the first counter for each of the detected input packets, wherein the count value of the first counter indicates the number of the input packets;
a second counter; and
a second control device configured to detect the output packets at the output of the multi-stage pipeline, and to increment a count value of the second counter for each of the detected output packets, wherein the count value of the second counter indicates the number of the output packets.

3. The clock-gating system of claim 2, wherein the clock controller further comprises:
a compare device configured to compare the count value of the first counter with the count value of the second counter, and to generate a flag based on the comparison, wherein the flag indicates whether the multi-stage pipeline is empty; and
a clock control device configured to instruct the clock-gating device to pass the clock signal if the flag does not indicate the multi-stage pipeline is empty, and to instruct the clock-gating device to gate the clock signal if the flag indicates the multi-stage pipeline is empty.

4. The clock-gating system of claim 3, wherein the flag indicates the multi-stage pipeline is empty if the count value of the first counter and the count value of the second counter match.

5. The clock-gating system of claim 4, wherein the flag does not indicate the multi-stage pipeline is empty if the count value of the first counter and the count value of the second counter do not match.

6. The clock-gating system of claim 2, wherein the first control device is configured to detect each of the input packets by detecting a delimiter of the input packet.

7. The clock-gating system of claim 6, wherein the second control device is configured to detect each of the output packets by detecting a delimiter of the output packet.

8. The clock-gating system of claim 1, wherein the clock controller is configured to instruct the clock-gating device to gate the clock signal if the number of the input packets matches the number of the output packets, and to instruct the clock gating device to pass the clock signal if the number of the input packets does not match the number of the output packets.

9. The clock-gating system of claim 8, wherein, after instructing the clock-gating device to gate the clock signal, the clock controller is further configured to monitor the input of the multi-stage pipeline for a next input packet, and, upon detection of the next input packet, to instruct the clock-gating device to pass the clock signal.

10. The clock-gating system of claim 1, wherein the multi-stage pipeline is an image processing pipeline.

11. A method for clock gating, comprising:
tracking a number of input packets at at least a single input of a multi-stage pipeline;
tracking a number of output packets at at least a single output of the multi-stage pipeline;
determining whether to gate or pass a clock signal to the multi-stage pipeline based on the number of the input packets at the at least single input of the multi-stage pipeline and the number of the output packets at the at least single output of the multi-stage pipeline;
passing the clock signal to the multi-stage pipeline if a determination is made to pass the clock signal; and
gating the clock signal if a determination is made to gate the clock signal.

12. The method of claim 11, wherein tracking the number of the input packets comprises incrementing a count value of a first counter for each of the input packets, and tracking the number of the output packets comprises incrementing a count value of a second counter for each of the output packets.

13. The method of claim 12, wherein incrementing the count value of the first counter includes:
detecting each of the input packets at the input of the multi-stage pipeline by detecting a delimiter of the input packet; and
incrementing the count value of the first counter for each of the detected input packets.

14. The method of claim 12, wherein incrementing the count value of the second counter includes:
detecting each of the output packets at the output of the multi-stage pipeline by detecting a delimiter of the output packet; and
incrementing the count value of the second counter for each of the detected output packets.

15. The method of claim 12, wherein determining whether to gate or pass the clock signal comprises:
comparing the count value of the first counter with the count value of the second counter; and
determining whether to gate or pass the clock signal based on the comparison.

16. The method of claim 15, wherein determining whether to gate or pass the clock signal comprises determining to gate the clock signal if the count value of the first counter and the count value of the second counter match.

17. The method of claim 16, wherein determining whether to gate or pass the clock signal comprises determining to pass the clock signal if the count value of the first counter and the count value of the second counter do not match.

18. The method of claim 11, wherein determining whether to gate or pass the clock signal comprises:
determining to gate the clock signal if the number of the input packets matches the number of the output packets; and
determining to pass the clock signal if the number of the input packets does not match the number of the output packets.

19. The method of claim 18, further comprising:
after gating the clock signal, monitoring the input of the multi-stage pipeline for a next input packet; and
passing the clock signal upon detection of the next input packet.

20. The method of claim 11, wherein the multi-stage pipeline is an image processing pipeline.

* * * * *